(12) United States Patent
Tweedt et al.

(10) Patent No.: US 10,501,177 B2
(45) Date of Patent: Dec. 10, 2019

(54) CONVERTIBLE PROPELLER

(71) Applicant: General Electric Company, Schenectady, NY (US)

(72) Inventors: Daniel Lawrence Tweedt, West Chester, OH (US); Andrew Breeze-Stringfellow, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 212 days.

(21) Appl. No.: 15/626,825

(22) Filed: Jun. 19, 2017

(65) Prior Publication Data

US 2018/0362155 A1 Dec. 20, 2018

(51) Int. Cl.
| | | |
|---|---|---|
| *B64C 29/00* | (2006.01) | |
| *B64C 11/00* | (2006.01) | |
| *B64C 11/48* | (2006.01) | |
| *B64C 11/30* | (2006.01) | |
| *B64C 11/28* | (2006.01) | |

(52) U.S. Cl.
CPC ........ *B64C 29/0033* (2013.01); *B64C 11/003* (2013.01); *B64C 11/28* (2013.01); *B64C 11/30* (2013.01); *B64C 11/48* (2013.01)

(58) Field of Classification Search
CPC ... B64C 29/0033; B64C 11/003; B64C 11/28; B64C 11/30; B64C 11/48
See application file for complete search history.

(56) References Cited

U.S. PATENT DOCUMENTS

| | | | |
|---|---|---|---|
| 1,673,233 A | 6/1928 | De La Cierva | |
| 3,957,229 A * | 5/1976 | Davis | B64C 11/28 244/53 R |
| 4,394,109 A * | 7/1983 | Ritchie | B64C 11/28 415/129 |
| 4,712,978 A | 12/1987 | Tiemann | |
| 4,793,572 A * | 12/1988 | Mecca | B64C 27/24 244/7 A |
| 4,801,243 A * | 1/1989 | Norton | B63H 1/20 416/142 |
| 4,936,526 A * | 6/1990 | Gries | B64C 11/28 244/53 R |
| 4,958,289 A * | 9/1990 | Sum | B64C 11/305 416/27 |
| 4,979,876 A * | 12/1990 | Chapman | B64C 11/28 244/3.29 |
| 5,174,716 A * | 12/1992 | Hora | B64C 11/32 416/129 |
| 5,224,831 A * | 7/1993 | Hermans | B64C 11/06 416/129 |
| 5,743,489 A * | 4/1998 | Stemme | B64C 11/28 244/59 |
| 6,669,137 B1 | 12/2003 | Chen | |

(Continued)

*Primary Examiner* — Hieu T Vo
*Assistant Examiner* — Sherman D Manley
(74) *Attorney, Agent, or Firm* — General Electric; Pamela Kachur

(57) ABSTRACT

A variable-solidity propeller apparatus, comprising a propeller having at least one rotatable hub carrying at least one row of propeller blades, wherein the propeller has a first configuration in which the propeller has a first average solidity, and a second configuration in which the propeller has a second average solidity which is greater than the first average solidity.

19 Claims, 11 Drawing Sheets

(56) References Cited

U.S. PATENT DOCUMENTS

| | | | |
|---|---|---|---|
| 6,769,644 B2 | 8/2004 | Muylaert et al. | |
| 8,042,763 B2 | 10/2011 | Arlton et al. | |
| 9,004,393 B2 | 4/2015 | Barrett-Gonzales | |
| 9,217,391 B2* | 12/2015 | Gallet | F02K 3/062 |
| 2012/0000177 A1* | 1/2012 | Vuillemin | B64C 11/28 |
| | | | 60/39.162 |
| 2015/0132104 A1* | 5/2015 | Long | B64C 11/00 |
| | | | 415/60 |
| 2016/0201503 A1* | 7/2016 | Zatorski | F01D 5/282 |
| | | | 416/2 |
| 2017/0138370 A1* | 5/2017 | Miller | F04D 27/002 |

* cited by examiner

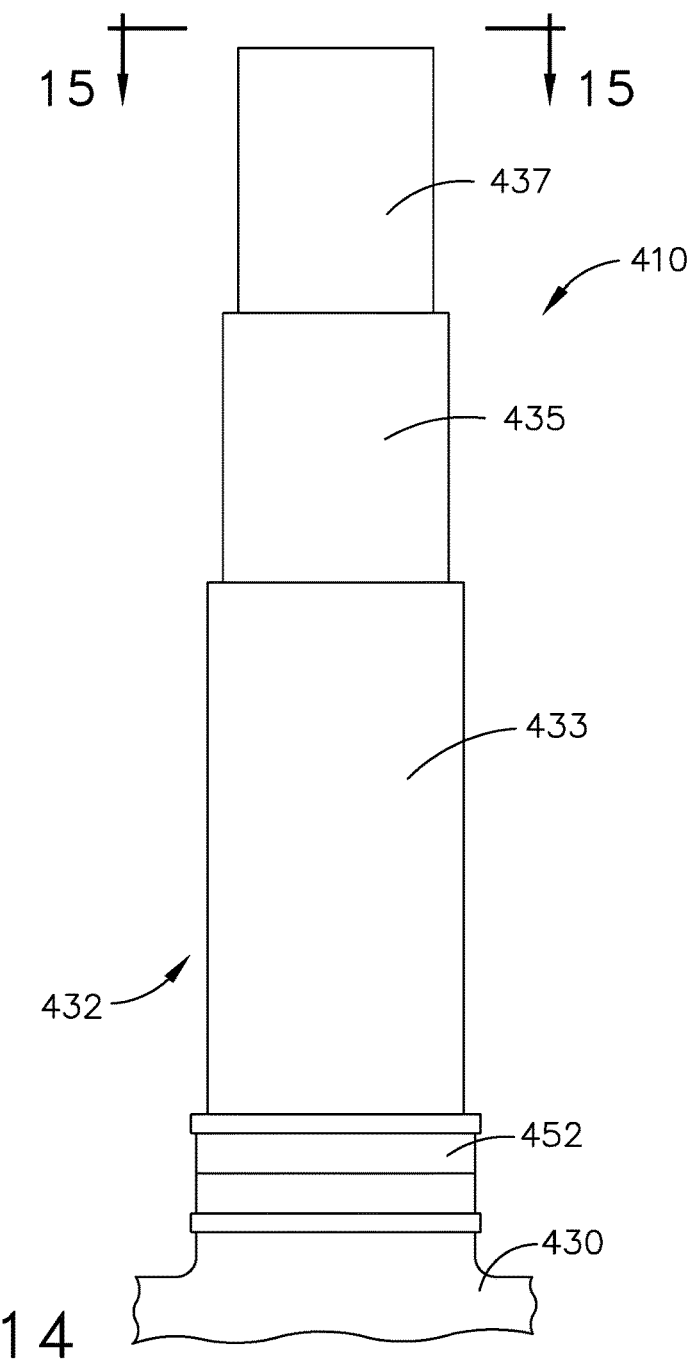

US 10,501,177 B2

CONVERTIBLE PROPELLER

BACKGROUND OF THE INVENTION

This invention relates generally to vehicle propulsion, and more specifically to propellers for aircraft engines.

Propellers are commonly used to provide propulsion for aircraft. A propeller includes a number of airfoil-shaped blades attached to a hub which is rotated by a prime mover in order to generate thrust.

For efficient operation, the aerodynamic characteristics of the propeller must be closely matched to intended operating conditions. Examples of propeller design parameters include the blade airfoil section, blade span and chord, blade count, sweep angle, etc. One significant parameter is blade solidity. This is a nondimensional parameter defined as the ratio of the blade chord to the blade circumferential spacing at a given radius from the propeller's centerline axis.

There is a desire to produce propeller-driven aircraft capable of multiple modes of flight including vertical takeoff, hovering, and conventional flight at high subsonic speeds.

One problem with such aircraft is that it is difficult to provide a propeller with adequate performance and efficiency for all flight modes. Propellers designed and sized to be efficient at high subsonic speeds (e.g. cruise Mach numbers above 0.3) generally do not have enough aerodynamic solidity to provide adequate thrust for vertical takeoff and landing. Conversely, propellers with sufficient aerodynamic solidity for hovering flight have efficiencies that progressively degrade with higher flight speed as flight speeds exceed Mach 0.3.

BRIEF DESCRIPTION OF THE INVENTION

This problem is addressed by the technology described herein, which provides a propeller having a mechanically variable solidity.

According to one aspect of the technology described herein, a variable-solidity propeller apparatus includes a propeller having at least one rotatable hub carrying at least one row of propeller blades, wherein the propeller has a first configuration in which the propeller has a first average solidity, and a second configuration in which the propeller has a second average solidity which is greater than the first average solidity.

According to another aspect of the technology described herein, a variable-solidity propeller apparatus includes: a first rotor including a first hub mounted for rotation about an axis, the first hub carrying a first row of propeller blades; and a second rotor including a second hub mounted for rotation about the axis, the second hub carrying a second row of propeller blades. The second row of propeller blades are movable between an extended position and a retracted position.

BRIEF DESCRIPTION OF THE DRAWINGS

The invention may be best understood by reference to the following description taken in conjunction with the accompanying drawing figures in which:

FIG. 14 is a schematic side elevation view of a representative blade of an alternative convertible propeller, shown in an extended position;

FIG. 15 is a view taken along lines 15-15 of FIG. 14;

DETAILED DESCRIPTION OF THE INVENTION

Figure 1:
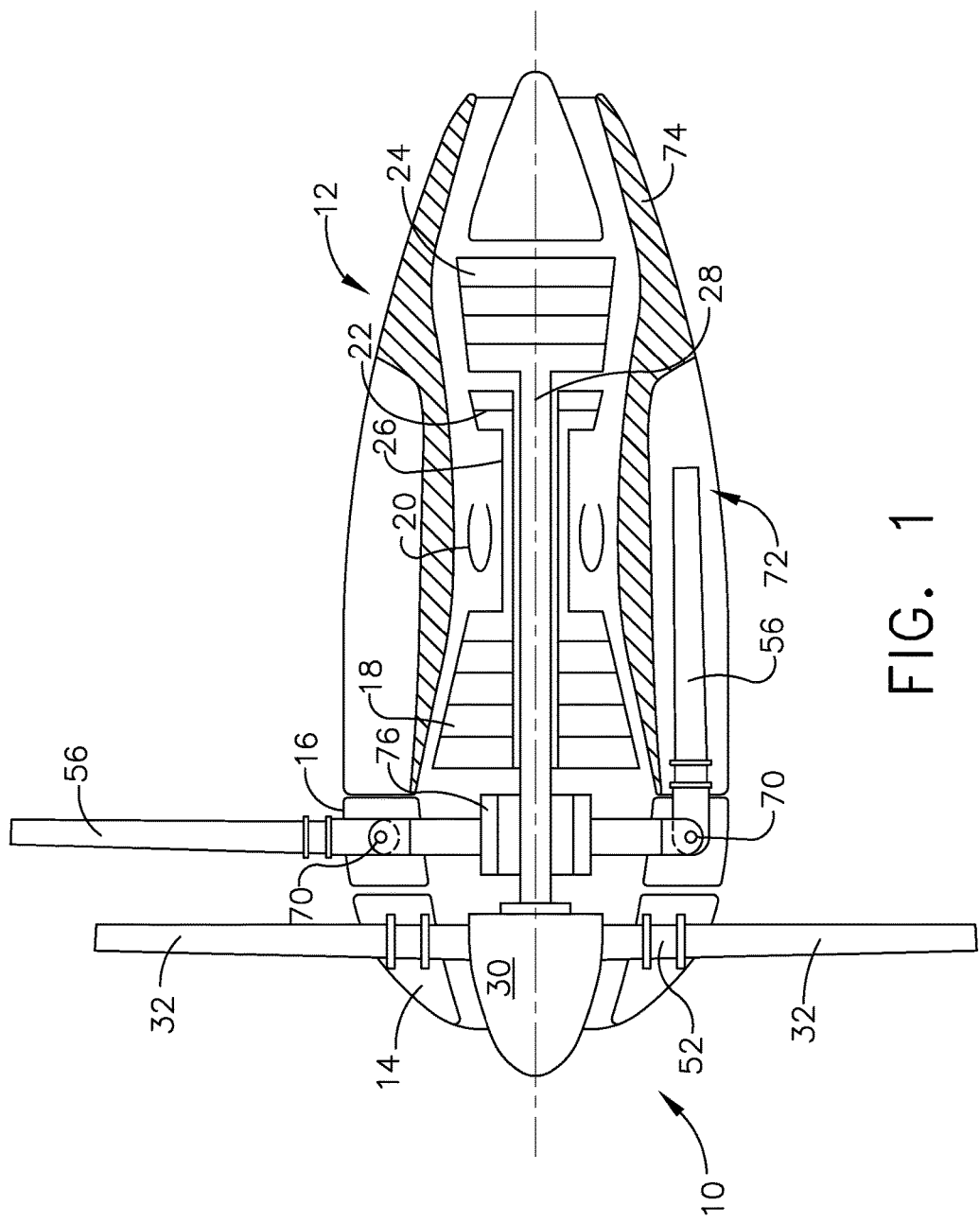
FIG. 1 is a schematic cross-sectional view of a gas turbine engine incorporating an embodiment of a convertible propeller.

Referring to the drawings wherein identical reference numerals denote the same elements throughout the various views, FIG. 1 depicts a convertible propeller 10 which is drivingly coupled to a prime mover 12. In the illustrated example, the convertible propeller 10 includes a first or forward rotor 14, and a second or aft rotor 16.

The prime mover 12 which may be any device operable to rotate the propeller 10 at the required speed under expected mechanical and aerodynamic loads. Nonlimiting examples of prime movers include heat engines, motors (e.g. electric, hydraulic, or pneumatic), or combinations thereof (for example electric hybrid drivetrains). The propeller 10 may be driven directly by the prime mover 12, or through an intermediate geartrain.

It would also be possible to couple the convertible propeller 10 to a mechanical load (not shown), such as an electrical generator, pump, etc. and use the propeller 10 in the manner of a wind mill or wind turbine, absorbing flow energy from the wind to drive the mechanical load.

The prime mover 12 may rotate the forward and aft rotors 14, 16 at the same speed or different speeds, and may rotate the forward and aft rotors 14, 16 in the same direction (co-rotating) or in different directions (counter-rotating).

In the illustrated example, the prime mover 12 comprises a gas turbine engine. The engine includes, in axial flow sequence, a compressor 18, a combustor 20, a gas generator turbine 22, and a work turbine 24. Collectively, the compressor 18, combustor 20, and gas generator turbine 22 define a core of the engine. The gas generator turbine 22 and the compressor 18 are interconnected by an outer shaft 26. The propeller 10 and the work turbine 24 are interconnected by an inner shaft 28.

Figure 2:
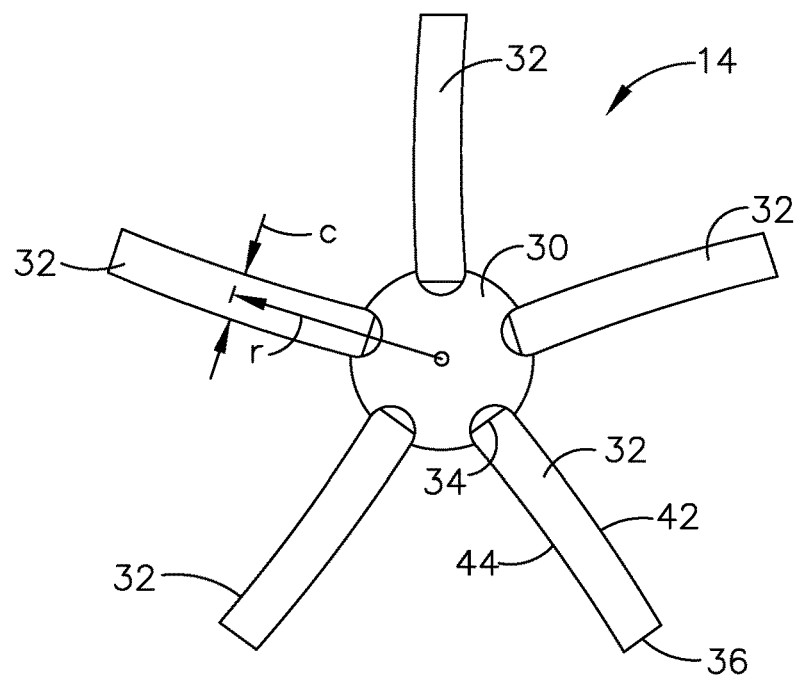
FIG. 2 is a schematic front elevational view of a forward rotor of the convertible propeller of FIG. 1.
Figure 3:
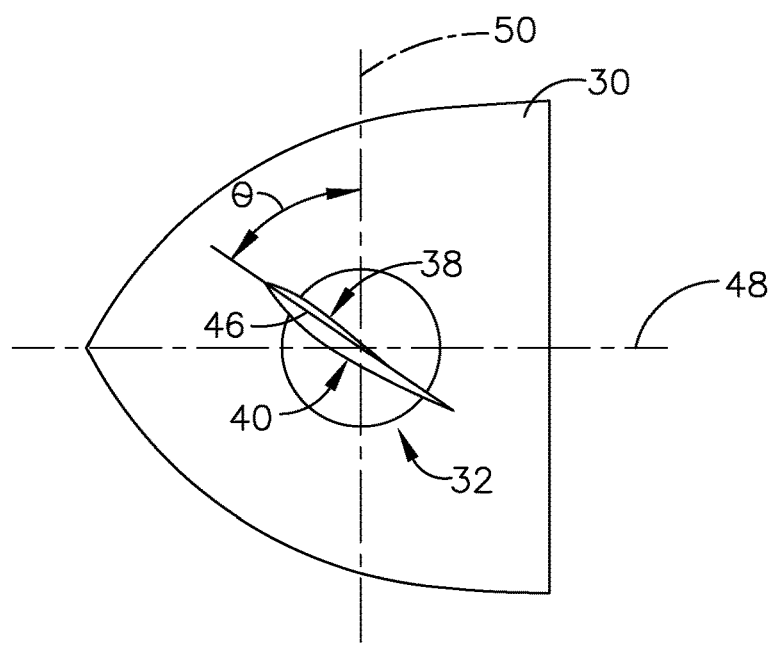
FIG. 3 is a schematic side elevation view of a blade of the convertible propeller shown in FIG. 2.

FIGS. 2 and 3 illustrate the forward rotor 14 in more detail. The forward rotor 14 comprises a hub or disk 30 having a plurality of blades 32 extending therefrom. Each blade 32 extends from a root 34 at the hub 30 to a tip 36, and includes a generally concave pressure side 38 joined to a generally convex suction side 40 at a leading edge 42 and a trailing edge 44. Each blade 32 has a span (or span dimension) defined as the radial distance from the root 34 to the tip 36, and every airfoil section thereof has a chord (or chord dimension) "c" defined as the length of an imaginary straight line, referred to as a "chord line" 46, connecting the leading edge 42 and the trailing edge 44.

The blades 32 can be uniformly or non-uniformly spaced apart around the periphery of the hub 30. A nondimensional parameter called "solidity" is defined as $cZ/2\pi r$, where "c" is equal to the airfoil section chord as described above, "Z" is the number of blades 32, and 'r' is the local radius of the airfoil section. This definition applies to most blade row geometries, where the blades are nearly identical, but it will be understood that other definitions might be more appropriate for non-uniform, or combined, or generally more complex blade configurations.

Accordingly, local blade solidity is directly proportional to chord length and the number of blades 32, and can be manipulated by changing either of these values. It will be understood that in general, increasing the airfoil section solidities of a propeller can be used to enable greater thrust at low flight speeds, but it also increases propeller blade aerodynamic drag and so can decrease propeller net efficiency for operation at high flight speeds, especially speeds above Mach 0.3. Each blade 32 has a spanwise distribution of airfoil section chords (or simply "chord distribution"), that is, a set of chord dimension values each corresponding to a location along the span, and thus has a spanwise distribution of solidity (or simply "solidity distribution").

A parameter called "chord-area" is defined herein for each blade 32 and is computed by integrating the above-described chord distribution of the blade 32 over the span of the blade 32. "Flow area" is defined herein for the forward rotor 14 and is equal to the annular area between the blade tip 36 radius and the blade root 34 radius.

FIG. 3 shows a representative one of the blades 32 of the forward rotor 14. It will be understood that in operation, the hub 30 rotates about a central axis 48, and the blades 32 sweep through a propeller plane 50 which is perpendicular to the central axis 48. Airfoil sections of the blades 32 are each disposed at some pitch angle θ, dependent on radius (the blades 32 may incorporate twist) and measured between the blade's chord line 46 and the propeller plane 50. A relatively small pitch angle θ is typically referred to as a "flat" or "fine" or "low" pitch, and a relatively large pitch angle θ is typically referred to as a "steep" or "coarse" or "high" pitch. It will be understood that in general, the appropriate pitch angles θ for efficient propulsion increase with increasing aircraft speed.

The blades 32 of the forward rotor 14 may have a "fixed pitch" configuration in which the airfoil section pitch angles θ of the blades 32 cannot be changed. Alternatively, the blades 32 of the forward rotor 14 may have a "variable pitch" configuration in which the airfoil section pitch angles θ of the blades 32 may be uniformly varied (i.e. same pitch angle change for all airfoil sections) in flight. A variable-pitch propeller may be used to provide thrust efficiently at both high and low speeds. One or more conventional pitch change actuators, shown schematically at 52, (FIG. 1) may be used to effect pitch changes.

Figure 4:
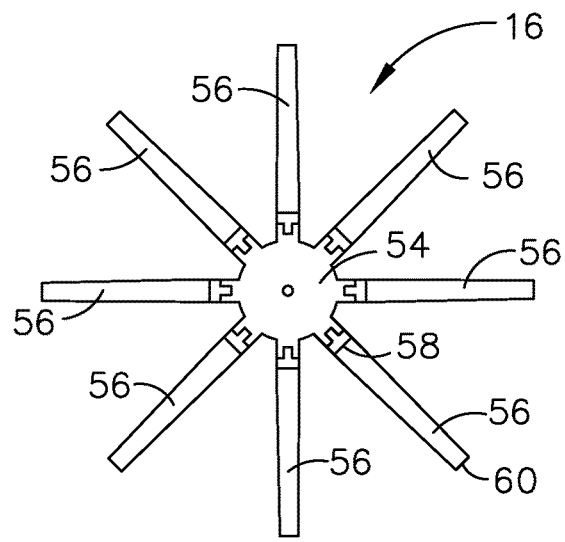
FIG. 4 is a schematic front elevational view of an aft rotor of the convertible propeller of FIG. 1.
Figure 5:
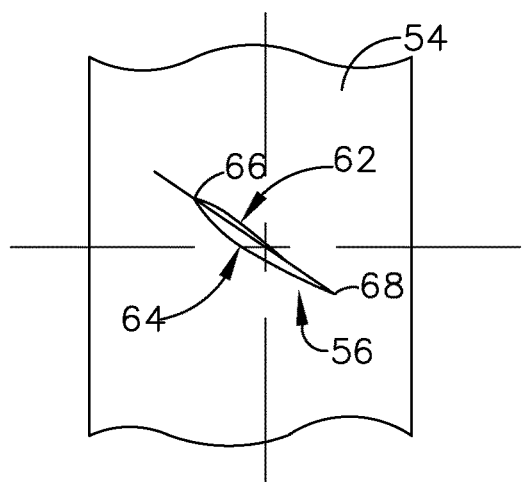
FIG. 5 is a schematic side elevation view of a blade of the convertible propeller shown in FIG. 4.

Referring to FIGS. 4 and 5, the aft rotor 16 comprises a hub or disk 54 having a plurality of blades 56 extending therefrom. Each blade 56 extends from a root 58 at the hub 54 to a tip 60, and includes a generally concave pressure side 62 joined to a generally convex suction side 64 at a leading edge 66 and a trailing edge 68. Each blade 56 has a span, a chord-area, a spanwise chord distribution, and a spanwise solidity distribution, as defined above, and the blades 56 can be uniformly or non-uniformly spaced around the hub 54. The blades 56 of the aft rotor 16 may be fixed pitch or variable pitch.

The blades 56 of the aft rotor 16 are wholly or partially retractable. As used herein, the term "retractable" refers to a structure having a first extended position projecting into the air stream, and a second retracted position not projecting into the air stream. Aft rotor 16 has a flow area equal to the annular area between the blade tip 60 radius and the blade root 58 radius for the wholly extended position.

In FIG. 1, the blades 56 of the aft rotor 16 are shown as being pivotable in an axial-radial plane about pivot points 70. One of the blades 56 of the aft rotor 16 is shown in an extended position, and another one of the blades 56 is shown in a retracted position, trailing axially aft and received in a blade well 72 formed in a nacelle 74 which houses the prime mover 12. A conventional actuator (not shown) may be used to affect the pivoting movement.

When the blades 56 are retracted, they may continue to rotate or they may be stopped. Optionally, means may be provided to selectively engage and disengage the aft rotor 16 from the prime mover 12. For example, in FIG. 1, the aft rotor 16 is shown as being coupled to the inner shaft 28 through a clutch 76.

In a first operating condition when the blades 56 of the aft rotor 16 are retracted, the propeller 10 has a first average solidity. "Average solidity" is a parameter defined and used herein to characterize the solidity of the entire propeller 10. The first average solidity may be computed by adding the chord-areas of all blades in the forward rotor 14, and then dividing that sum by the largest flow area in the propeller 10. It will be understood that the largest flow area may be found, depending on the particular configuration, in either of the rotors 14, 16. So for example if the aft rotor 16 has the greatest flow area, the first average solidity would be computed by dividing the summated chord-areas of the forward rotor by the flow area of the aft rotor 16. The first average solidity may be selected to provide best efficiency at a first design point, i.e. a specified atmospheric condition, altitude, and flight speed. An example of a first design point is high-speed horizontal cruise flight, for example flight speeds above Mach 0.3.

In a second operating condition when the blades 56 of the aft rotor 16 are extended, the propeller 10 has an increased average solidity, which may be computed by adding the chord-areas of all blades in the rotors 14, 16, and dividing the sum by the largest flow area in the propeller 10. The resulting average solidity is referred to herein as the second average solidity. The second average solidity is selected to provide a desired performance and efficiency at a second design point, i.e. a specified atmospheric condition, altitude, and flight speed. An example of a second design point is vertical takeoff and/or hovering flight of a tilt-rotor aircraft, as described in more detail below.

It will be understood that the average solidity of the propeller 10 is increased by extending the blades 56 of the aft rotor 16, whether the local solidities of the aft rotor 16 are less than, equal to, or greater than the local solidities of the forward rotor 14. The first and second average solidities may be selected as required to suit a particular application. As one example, for use in the above-mentioned tilt-rotor aircraft, the second average solidity may be approximately two to four times greater than the first average solidity.

Figure 6:
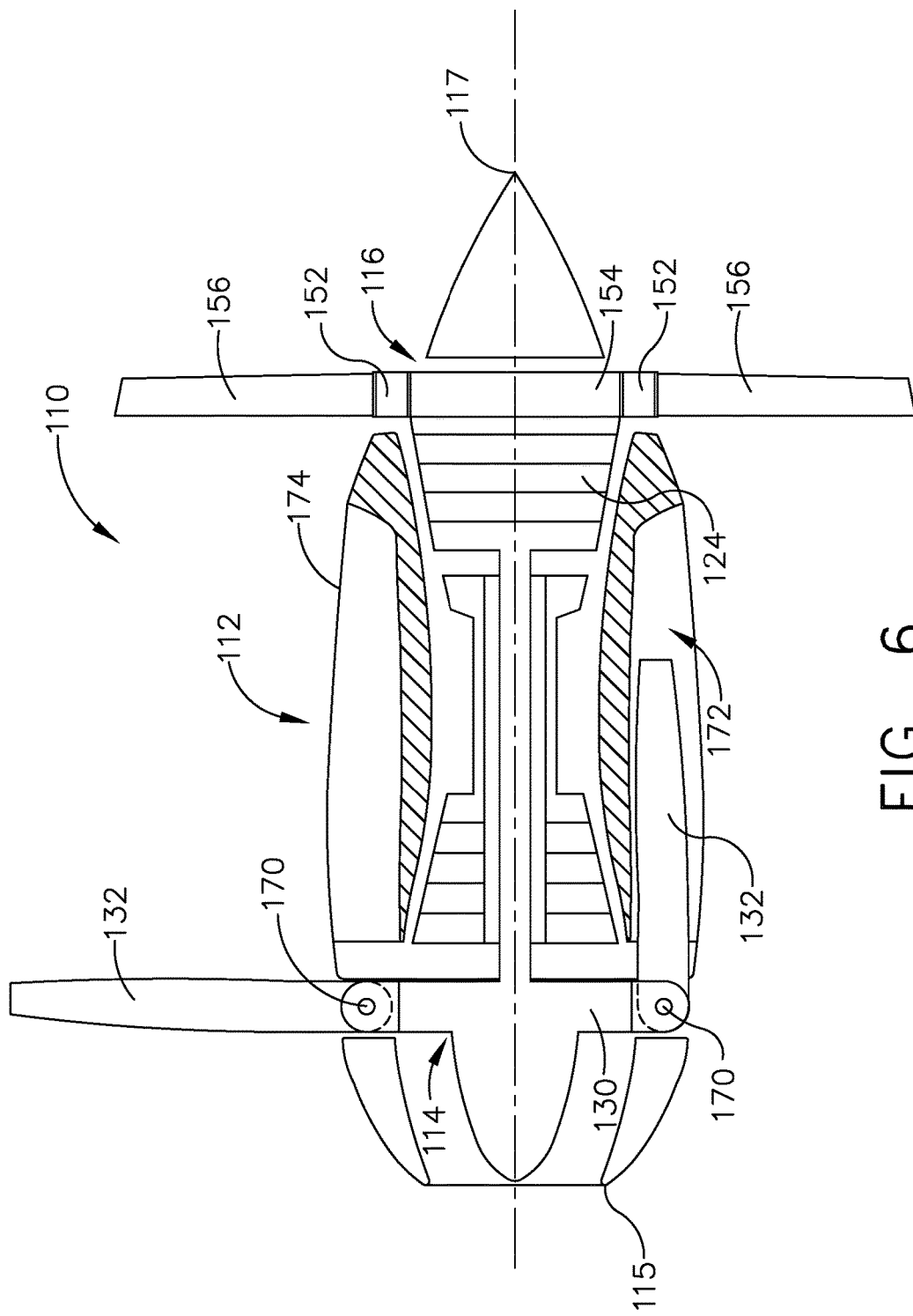
FIG. 6 is a schematic cross-sectional view of a gas turbine engine incorporating an alternative embodiment of a convertible propeller.

FIG. 6 depicts an alternative convertible propeller 110 which is drivingly coupled to a prime mover 112. In the illustrated example, the convertible propeller 110 includes a first or forward rotor 114 and a second or aft rotor 116. In contrast to the propeller 10 described above, there is a significant axial distance between the forward and aft rotors 114, 116, with the forward rotor 114 being disposed near a forward end 115 of the prime mover 112, and the aft rotor 116 being disposed near an aft end 117 of the prime mover 112. In the illustrated example, the prime mover 112 comprises a gas turbine engine, and the forward and aft rotors 114, 116 are both driven by the work turbine 124.

The aft rotor 116 has a flow area and comprises a plurality of blades 156 carried by a hub or disk 154. The blades 156 of the aft rotor 116 have a predetermined span, chord-areas, airfoil section chords, and solidity distribution, and can be uniformly or non-uniformly spaced around the hub 154.

The blades 156 of the aft rotor 116 may be fixed pitch or variable pitch. A conventional pitch change actuator, shown schematically at 152, may be used to provide variable pitch.

The forward rotor 114 has a flow area and comprises a plurality of blades 132 carried by a hub or disk 130. The blades 132 of the forward rotor 114 have a predetermined span, chord-areas, airfoil section chords, and solidity distribution, and can be uniformly or non-uniformly spaced around the hub 130. The blades 132 of the forward rotor 114 may be fixed pitch or variable pitch.

The blades 132 of the forward rotor 114 are wholly or partially retractable. The blades 132 of the forward rotor 114 are shown as being pivotable in an axial-radial plane about pivot points 170. One of the blades 132 of the forward rotor 114 is shown in an extended position, and another one of the blades 132 is shown in a retracted position, trailing axially aft and received in a blade well 172 formed in a nacelle 174 which houses the prime mover 112. A conventional actuator (not shown) may be used to affect the pivoting movement.

When the blades 132 are retracted, they may continue to rotate or they may be stopped. Optionally, means such as a clutch (not shown) may be provided to selectively engage and disengage the forward rotor 14 from the prime mover 112.

In a first operating condition when the blades 132 of the forward rotor 114 are retracted, the propeller 110 has a first average solidity computed considering the chord-area of the aft rotor 116, and the largest flow area in the propeller 110.

In a second operating condition when the blades 132 of the forward rotor 114 are extended, the propeller 132 has an increased average solidity, referred to as a second average solidity.

It will be understood that the average solidity of the propeller 110 is increased by extending the blades 132 of the forward rotor 114, whether the local solidities of the forward rotor 114 are less than, equal to, or greater than the local solidities of the aft rotor 116.

The first and second average solidities may be selected as required to suit a particular application, as described above.

Figure 7:
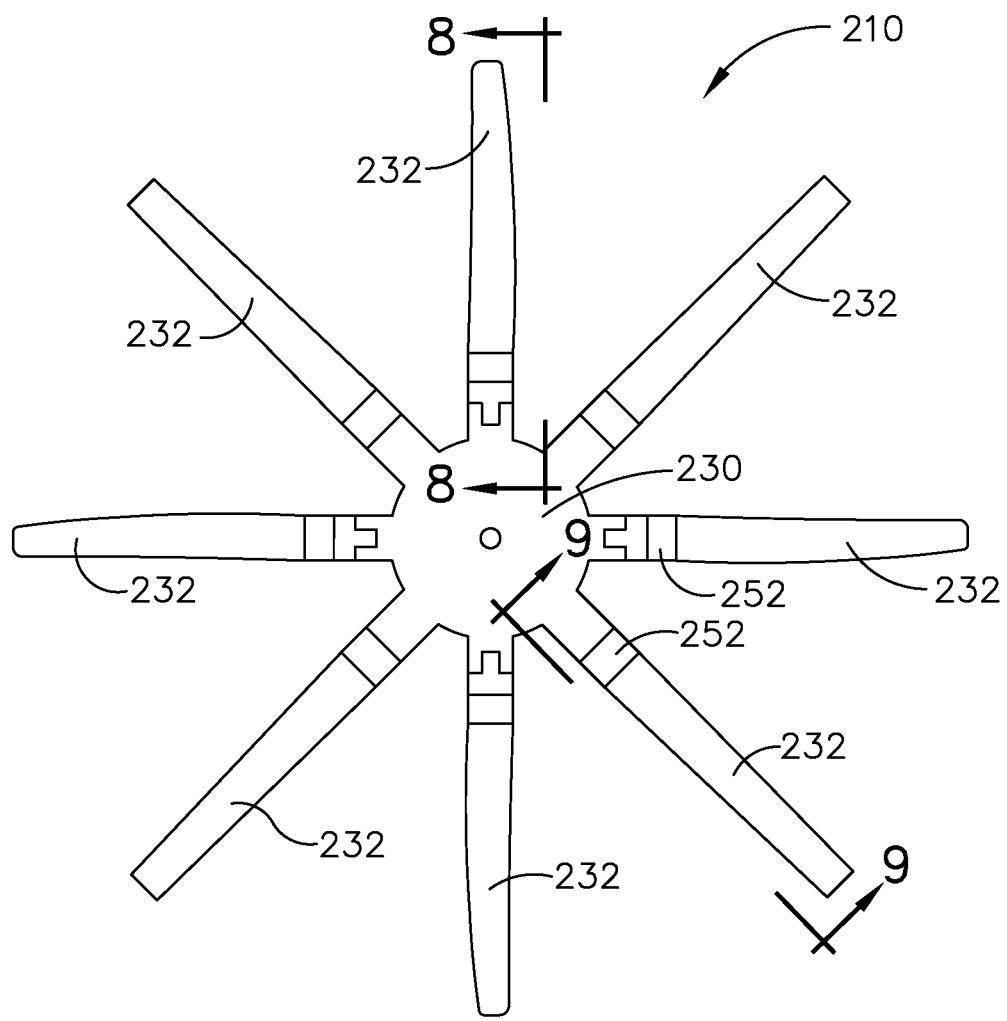
FIG. 7 is a schematic front elevational view of another alternative convertible propeller.
Figure 8:
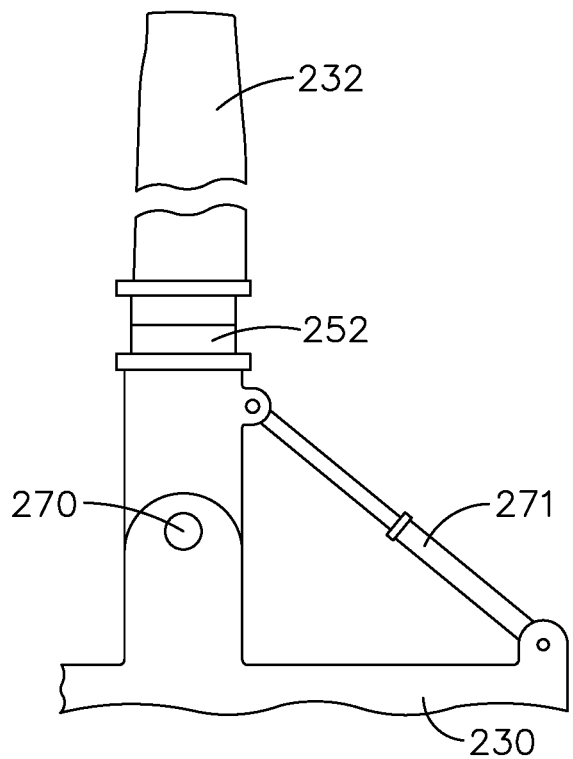
FIG. 8 is a view taken along lines 8-8 of FIG. 7.
Figure 9:
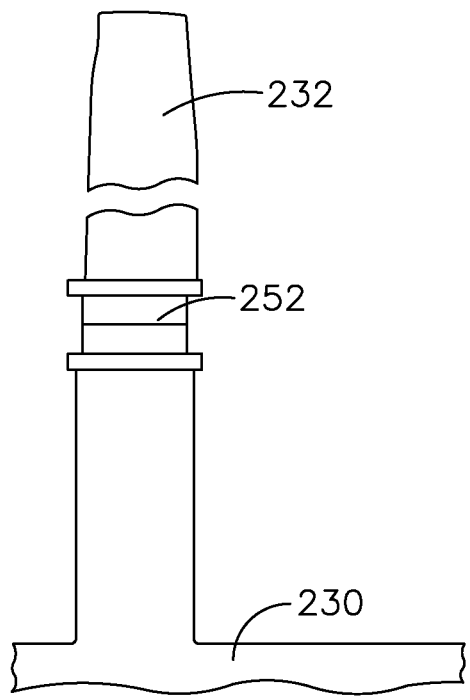
FIG. 9 is a view taken along lines 9-9 of FIG. 7.

FIGS. 7-9 illustrate another alternative convertible propeller 210. The propeller 210 is configured to be drivingly coupled to a prime mover as described above (not shown). The convertible propeller 210 includes a single rotor comprising a hub or disk 230 having a plurality of blades 232 extending therefrom. The blades 232 have a predetermined span, chord-areas, airfoil section chords, and solidity distribution, and can be uniformly or non-uniformly spaced around the hub 230.

The blades 232 may be fixed or variable pitch. In the illustrated example, each of the blades 232 is shown being coupled to the hub 230 by a conventional pitch change actuator 252.

Some of the blades 232 are fixed, as shown in FIG. 9, while some of the blades 232 are wholly or partially retractable. As seen in FIG. 8, the retractable ones of the blades 232 are shown as being pivotable in an axial-radial plane about pivot points 270. An exemplary retraction actuator 271 is shown schematically in FIG. 8. In the illustrated example, the total number of blades 232 is an even number, and alternate ones of the blades 232 are retractable. Solely for aerodynamic purposes, any combination or pattern of the blades 232 may be made fixed or retractable. For example, a pattern could include two or more retractable blades 232 disposed between each pair of fixed blades 232, or two or more fixed blades 232 disposed between each pair of retractable blades. For balance purposes the arrangement may be symmetric as illustrated.

In a first operating condition when some of the blades 232 are retracted, the propeller 210 has a first average solidity which is less than a maximum configurable average solidity.

In a second operating condition when all of the blades 232 are extended, the propeller 210 has an increased average solidity, referred to as a second average solidity.

Local solidities of the propeller 210 are changed by extending or retracting some of the blades 232. Accordingly, it will be understood that local solidities of the retractable blades 232 considered as a group separately from the fixed blades 232 may be less than, equal to, or greater than corresponding local solidities of the fixed blades 232 considered as a group.

The first and second average solidities may be selected as required to suit a particular application, as described above.

FIGS. 10-13 illustrate another alternative convertible propeller 310. The propeller 310 is configured to be drivingly coupled to a prime mover as described above (not shown). The convertible propeller 310 includes a single rotor comprising a hub or disk 330 having a plurality of blades 332 extending therefrom (only one blade 332 is shown). Each blade 332 has a predetermined span, and the blades 332 can be uniformly or non-uniformly spaced around the circumference of the hub 330.

The blades 332 may be fixed pitch or variable pitch. In the illustrated example, each of the blades 332 is shown being coupled to the hub 330 by a conventional pitch change actuator 352.

Figure 11:
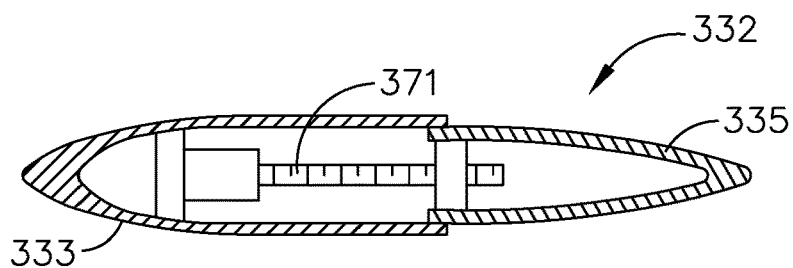
FIG. 11 is a view taken along lines 11-11 of FIG. 10.
Figure 10:
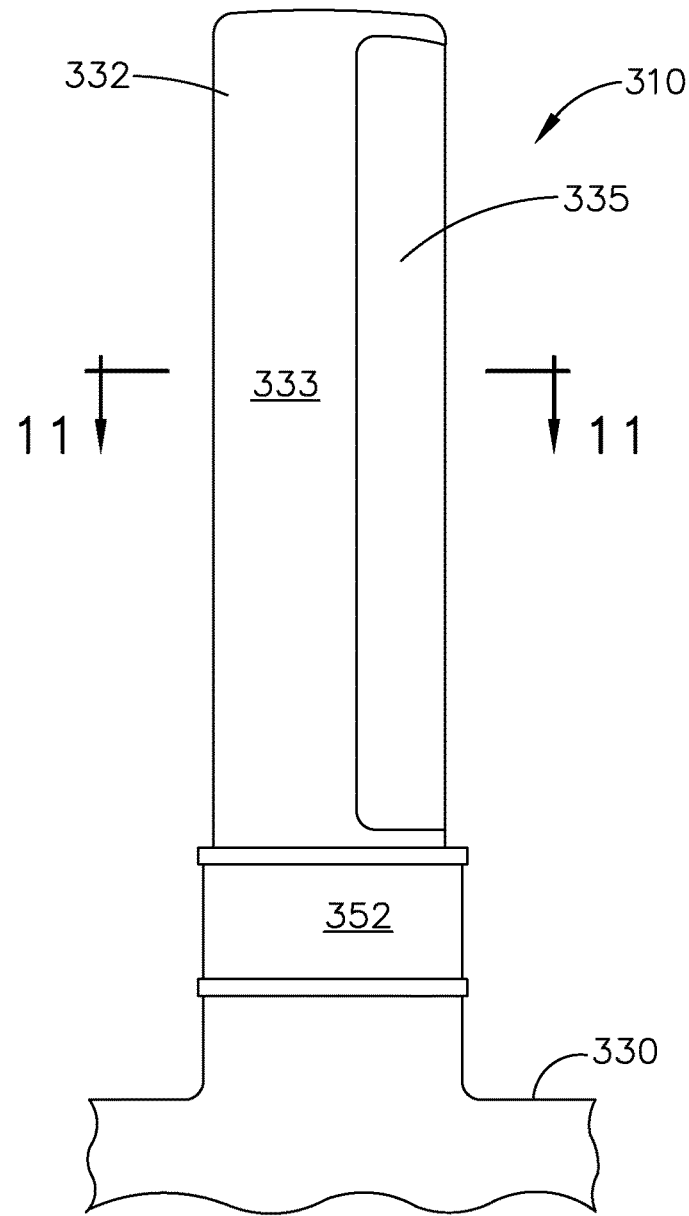
FIG. 10 is a schematic side elevation view of a representative blade of an alternative convertible propeller, shown in an extended position.
Figure 13:
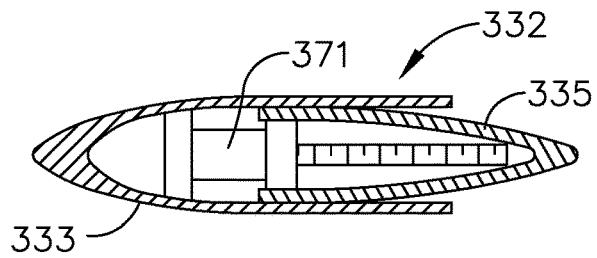
FIG. 13 is a view taken along lines 13-13 of FIG. 12.
Figure 12:
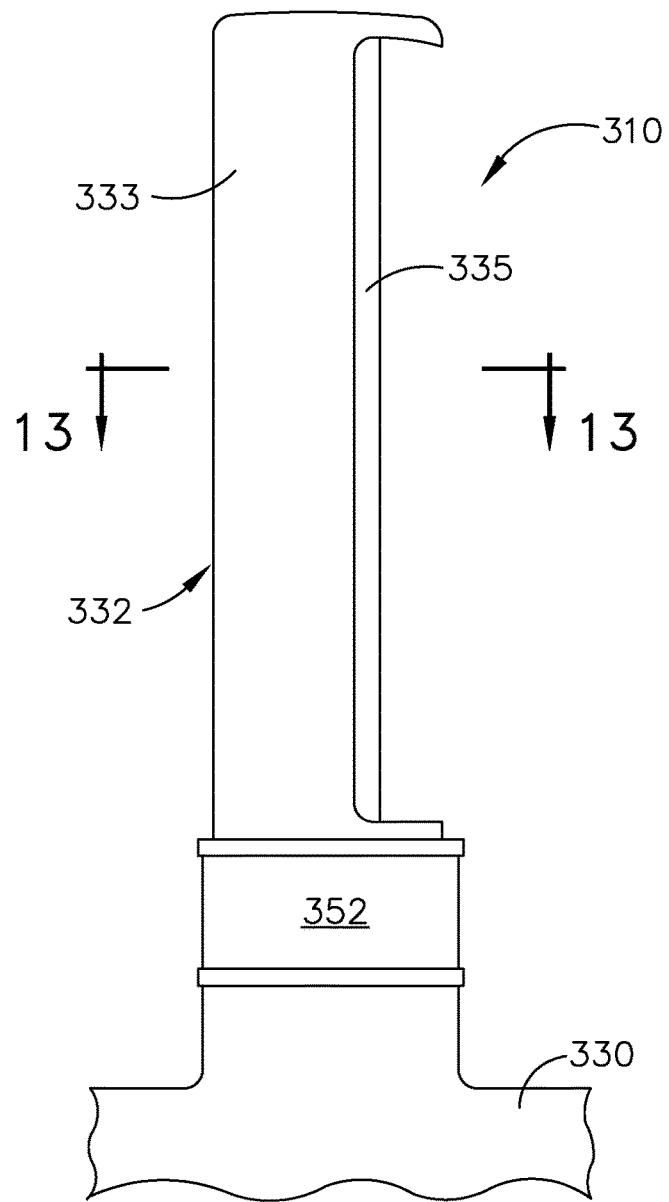
FIG. 12 is a schematic side view of the propeller blade shown in FIG. 10, in a retracted position.
Figures 16, 17:
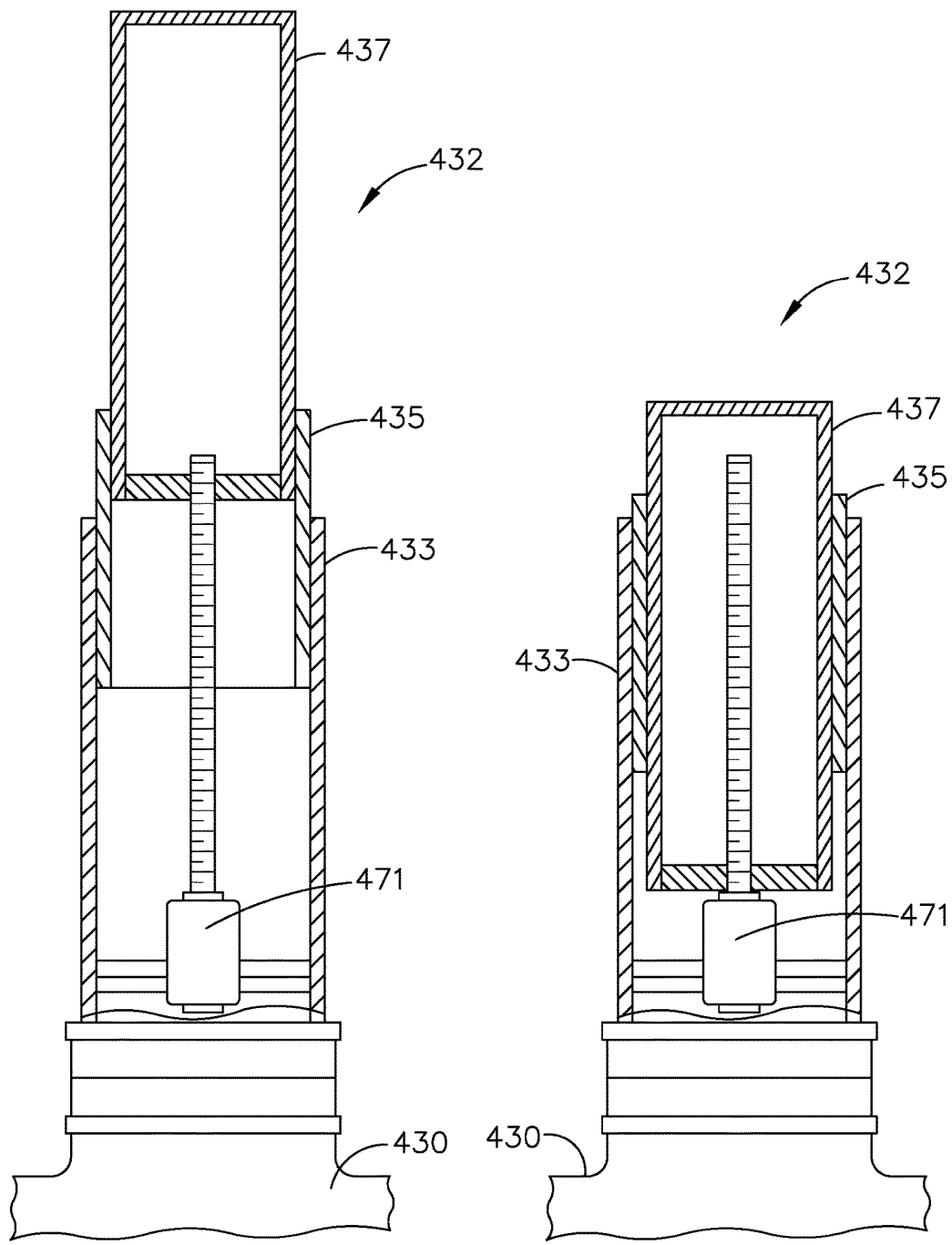
FIG. 16 is a cross-sectional view of the propeller blade of FIG. 14, in an extended position.
FIG. 17 is a cross-sectional view of the propeller blade of FIG. 14, in a retracted position.

At least some of the blades 332 have a retractable portion configured to enable a variable chord dimension. As seen in FIGS. 10 and 11, a blade 332 includes an airfoil-shaped fixed forward part 333 and an airfoil-shaped retractable aft part 335. The aft part 335 is mounted so as to be able to translate or telescope between a first, extended position shown in FIGS. 10 and 11 in which the blade airfoil section chord dimensions are at maximum values, and a second, retracted position shown in FIGS. 12 and 13 in which the blade airfoil section chord dimensions are at lower values. Movement between the extended and retracted positions may be accomplished, for example using an actuator 371 which is shown schematically. The aft part 335 may also be moved to intermediate positions between fully extended and fully retracted.

For aerodynamic purposes, any combination of the blades 332 may be made fixed or variable chord, although for balance purposes the arrangement may be symmetric.

In a first operating condition when the aft part 335 is retracted, the propeller 310 has a first average solidity which is less than a maximum configurable average solidity.

In a second operating condition when the aft part 335 is extended, the propeller 310 has an increased average solidity, referred to as a second average solidity.

The first and second average solidities may be selected as required to suit a particular application, as described above.

FIGS. 14-17 illustrate another alternative convertible propeller 410. The propeller 410 is configured to be drivingly coupled to a prime mover as described above (not shown). The convertible propeller 410 includes a single rotor comprising a hub or disk 430 having a plurality of blades 432 extending therefrom (only one blade 432 is shown). Each blade 432 has a predetermined span and predetermined airfoil section chords, and the blades 432 can be uniformly or non-uniformly spaced around the circumference of the hub 430.

The blades 432 may be fixed pitch or variable pitch. In the illustrated example, each of the blades 432 is shown being coupled to the hub 430 by a conventional pitch change actuator 452.

At least some of the blades 432 have a retractable portion configured to enable a variable span dimension. As seen in FIG. 14, a blade 432 includes an airfoil-shaped inner section 433, an airfoil-shaped retractable middle section 435, and an airfoil-shaped retractable outer section 437. The middle and outer sections 435, 437 are mounted so as to be able to translate or telescope between a first, extended position shown in FIGS. 14 and 16 in which the blade's span dimension and rotor flow area are at maximum values, and a second, retracted position shown in FIG. 17 in which the blade's span dimension and rotor flow area are at lower values. It will be understood that the maximum flow area represents the "largest flow area in the propeller" as defined above. Movement between the extended and retracted positions may be accomplished, for example, using the actuator 471 which is shown schematically. The blades may also be moved to intermediate positions between fully extended and fully retracted.

For aerodynamic purposes, any combination of the blades 432 may be made fixed or variable span, although for balance purposes the arrangement may be symmetric.

In a first operating condition when at least some of the blades 432 are retracted, the propeller 410 has a first solidity distribution and a first average solidity.

In a second operating condition when all of the blades 432 are extended, the propeller 410 has a greater summated chord-area than it has for the first operating condition, which results in a second average solidity that is greater than the first average solidity.

The first and second average solidities may be selected as required to suit a particular application, as described above.

Figure 18:
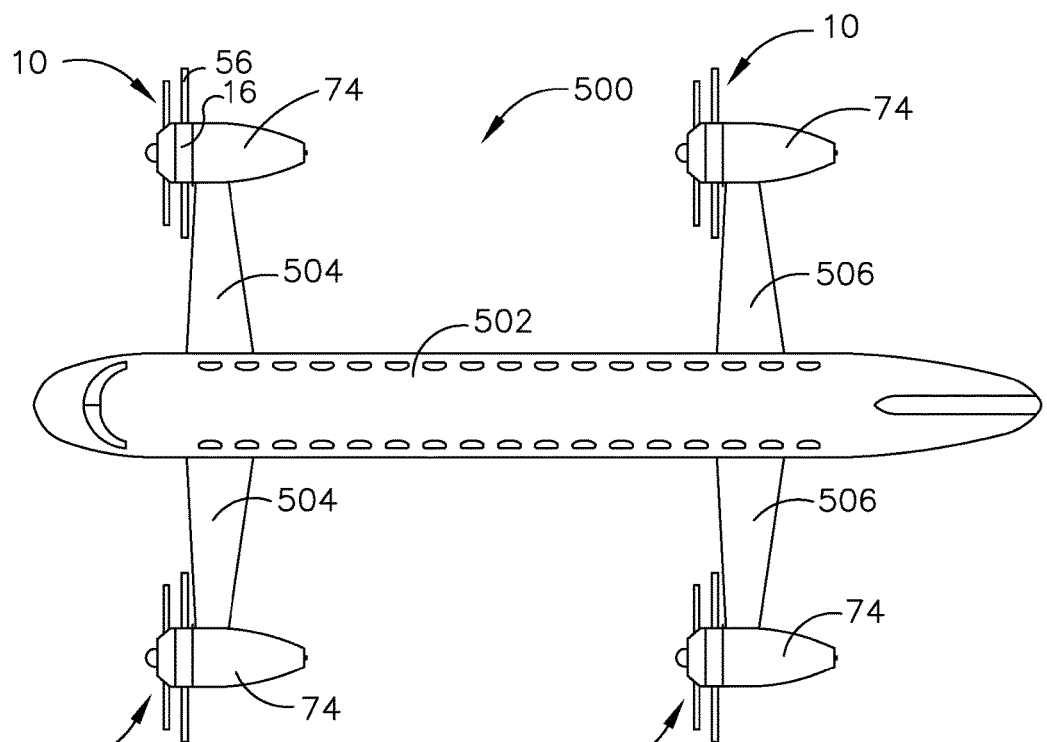
FIG. 18 is a schematic top plan view of an aircraft incorporating the propeller shown in FIG. 1.
Figure 19:
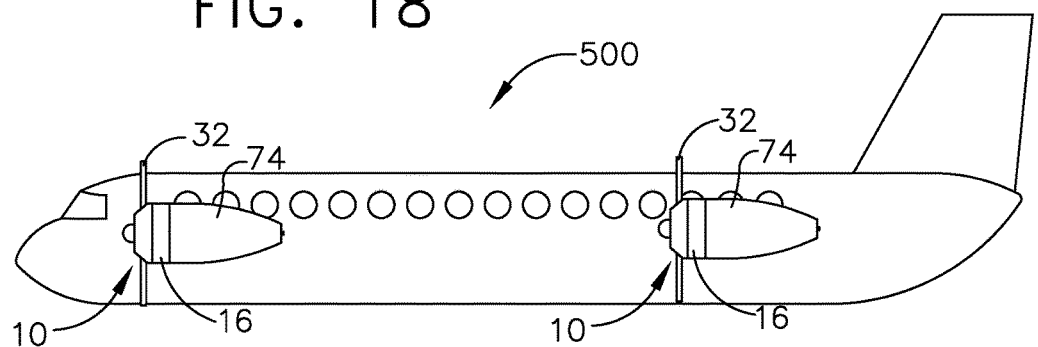
FIG. 19 is a schematic side elevation view of the aircraft of FIG. 18, with the propellers oriented for horizontal flight.
Figure 20:
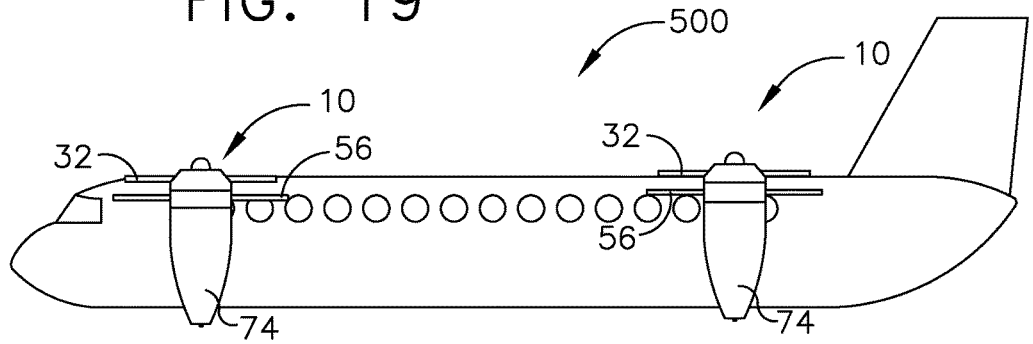
FIG. 20 is a schematic side elevation view of the aircraft of FIG. 18 with the propellers oriented for vertical flight.

FIGS. 18-20 illustrate an exemplary aircraft 500 which could be powered by any of the convertible propellers described above. The aircraft 500 has a fuselage 502. A pair of forward wings 504 extends from the fuselage 502. Each forward wing 504 has a nacelle 74 mounted at its tip carrying (for example) a propeller 10 as described above, the propeller 10 being driven by a prime mover located within the nacelle 74.

A pair of aft wings 506 extends from the fuselage 502. Each aft wing 506 has a nacelle 74 mounted at its tip carrying a propeller 10 as described above, the propeller 10 being driven by a prime mover located within the nacelle 74.

The nacelles 74 are equipped with appropriate actuators (not shown) enabling the nacelles 74 to be selectively pivoted between a horizontal position, shown in FIG. 19, and a vertical position, shown in FIG. 20.

In one mode, the aircraft 500 may be operated with the nacelles 74 in the horizontal position as shown in FIG. 19, using the propellers 10 to generate thrust and the wings 504, 506 to generate aerodynamic lift in a conventional fashion. In this mode of operation, the propellers 10 may be configured with the blades 56 of the aft rotor 16 retracted as described above, so that the propellers 10 have a first average solidity which is suitable for efficient operation over a range of speeds including the high-subsonic region (e.g. greater than Mach 0.3).

In another mode, the aircraft 500 may be operated with the nacelles 74 in the position as shown in FIG. 20, using the propellers 10 to generate direct lift for the purposes of vertical takeoff, hovering flight, or landing. In this mode of operation, the propellers 10 may be configured with the blades 56 of the aft rotor 16 extended as described above so that the propellers 10 have a second average solidity which is suitable for producing adequate thrust for vertical flight. In this flight mode, control of the aircraft 500 (e.g. roll, pitch, yaw, or translation in various directions) may be effected by modulating the thrust of the individual propellers 10, for example by varying the rotational speed of the propellers 10 or by varying the pitch angle of the propeller blades.

The apparatus described herein has several advantages over prior art. It permits use of a propeller for aircraft propulsion at low flight speeds including vertical climb and descent, as well as high flight speeds, with good efficiency.

Furthermore, it facilitates the use of a single prime mover and/or shaft for each propeller, as opposed to using separate motors and/or propellers for takeoff and cruise, thereby economizing on propulsion system weight.

The foregoing has described a propeller. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A variable-solidity propeller apparatus, comprising a propeller having at least one rotatable hub carrying at least one row of propeller blades, wherein the propeller has a first configuration in which the propeller has a first average solidity, and a second configuration in which the propeller has a second average solidity which is greater than the first average solidity; and wherein the propeller has a third configuration with an average solidity intermediate between the first and second average solidities.

2. The apparatus of claim 1 wherein at least a portion of at least some of the propeller blades is movable between a first position defining the first configuration, and a second position defining the second configuration.

3. The apparatus of claim 1 wherein the second average solidity is at least twice as large as the first average solidity.

4. The apparatus of claim 1 further comprising a prime mover coupled in driving relationship with the propeller.

5. The apparatus of claim 1 further comprising a mechanical load coupled to the propeller.

6. A variable-solidity propeller apparatus, comprising a propeller including:
   at least one rotatable hub carrying at least one row of propeller blades, wherein the propeller has a first configuration in which the propeller has a first average solidity, and a second configuration in which the propeller has a second average solidity which is greater than the first average solidity;
   wherein the propeller includes a first rotatable hub carrying a row of first propeller blades, and a second rotatable hub carrying a row of second propeller blades;
   the second propeller blades are movable between an extended position and a retracted; and
   wherein the first propeller blades have a variable pitch angle, and the second propeller blades have a fixed pitch angle.

7. The apparatus of claim 6 further comprising a prime mover coupled in driving relationship with the first and second hubs, wherein the second hub is driven through a clutch configured to be selectively engaged or disengaged from the prime mover.

8. The apparatus of claim 6 further comprising a prime mover coupled in driving relationship with the first and second hubs, wherein the prime mover has spaced-apart forward and aft ends, and both of the first and second hubs are disposed at the forward end, or at the aft end.

9. A variable-solidity propeller apparatus, comprising:
   at least one rotatable hub carrying at least one row of propeller blades, wherein the propeller has a first configuration in which the propeller has a first average solidity, and a second configuration in which the propeller has a second average solidity which is greater than the first average solidity;
   wherein the propeller includes a first rotatable hub carrying a row of first propeller blades, and a second rotatable hub carrying a row of second propeller blades; and
   a prime mover coupled in driving relationship with the first and second hubs, wherein the prime mover has spaced-apart forward and aft ends, one of the first and second hubs is disposed at the forward end, and the other of the first and second hubs is disposed at the aft end.

10. A variable-solidity propeller apparatus, comprising a propeller having a single hub having a single row of propeller blades, wherein the propeller has a first configuration in which the propeller has a first average solidity, and a second configuration in which the propeller has a second average solidity which is greater than the first average solidity; and
   wherein some of the propeller blades are fixed and some of the propeller blades are movable between an extended position and a retracted position.

11. The apparatus of claim 10 wherein the row of propeller blades includes an even number of propeller blades, and alternate ones of the propeller blades are movable.

12. The apparatus of claim 10 wherein the propeller blades have a variable pitch angle.

13. A variable-solidity propeller apparatus, comprising a propeller having a single hub having a single row of propeller blades, wherein the propeller has a first configuration in which the propeller has a first average solidity, and a second configuration in which the propeller has a second average solidity which is greater than the first average solidity; and wherein at least some of the propeller blades include a retractable section which is movable between an extended position in which the corresponding propeller blade has maximum chord dimensions, and a retracted position in which the corresponding propeller blade has reduced chord dimensions.

14. The apparatus of claim 13 wherein the propeller blades have a variable pitch angle.

15. A variable-solidity propeller apparatus, comprising a propeller having a single hub having a single row of propeller blades, wherein the propeller has a first configuration in which the propeller has a first average solidity, and a second configuration in which the propeller has a second average solidity which is greater than the first average solidity, and wherein at least some of the propeller blades include one or more retractable sections which are movable between an extended position in which the corresponding propeller blade has a maximum span dimension, and a retracted position in which the corresponding propeller blade has a reduced span dimension.

16. A variable-solidity propeller apparatus, comprising:
   a first rotor including a first hub mounted for rotation about an axis, the first hub carrying a first row of propeller blades;
   a second rotor including a second hub mounted for rotation about the axis, the second hub carrying a second row of propeller blades;
   wherein the second row of propeller blades are movable between an extended position and a retracted position and the first row of propeller blades have a variable pitch angle and the second row of propeller blades have a fixed pitch angle.

17. The apparatus of claim 16 further comprising a prime mover coupled in driving relationship with the first and second hubs, wherein the second hub is driven through a clutch configured to be selectively engaged or disengaged from the prime mover.

18. The apparatus of claim 16 further comprising a prime mover coupled in driving relationship with the first and second hubs, wherein the prime mover has spaced-apart forward and aft ends, and both of the first and second hubs are disposed at the forward end, or at the aft end.

19. The apparatus of claim 16 further comprising a prime mover coupled in driving relationship with the first and second hubs, wherein the prime mover has spaced-apart forward and aft ends, one of the first and second hubs is disposed at the forward end, and the other of the first and second hubs is disposed of the aft end.

* * * * *